United States Patent [19]

Tufts

[11] 4,420,403
[45] Dec. 13, 1983

[54] FILTER MODULE

[75] Inventor: Wesley M. Tufts, Holliston, Mass.

[73] Assignee: Control Fluidics, Inc., West Bridgewater, Mass.

[21] Appl. No.: 404,635

[22] Filed: Aug. 2, 1982

[51] Int. Cl.³ .................. B01D 23/10; B01D 33/18
[52] U.S. Cl. .................. 210/787; 210/807; 210/289; 210/304; 210/354
[58] Field of Search ............ 210/265, 289, 291, 263, 210/288, 787, 801–804, 807, 661, 354, 355, 304, 512

[56] References Cited

U.S. PATENT DOCUMENTS

| 2,087,778 | 7/1937 | Nelin | 210/265 |
| 2,546,650 | 3/1951 | Nijboer | 210/807 |
| 3,471,025 | 10/1969 | Dobson | 210/290 |
| 3,882,025 | 5/1975 | Talley, Jr. | 210/354 |

FOREIGN PATENT DOCUMENTS

| 2621307 | 11/1976 | Fed. Rep. of Germany | 210/355 |
| 1305399 | 1/1973 | United Kingdom | 210/807 |
| 791609 | 12/1980 | U.S.S.R. | 210/787 |

Primary Examiner—Benoît Castel
Attorney, Agent, or Firm—Robert T. Gammons

[57] ABSTRACT

A filter module wherein the fluid to be filtered is projected into a chamber containing a floating bed of buoyant bodies confined within the chamber at the top side and wherein the point of entry of the fluid is constantly moved about the center of the bed so that successive portions of the bed are subjected to weltering while the remainder is quiescent such that the solids are separated from the bodies dispersed by weltering and gravitate to the bottom of the module and are drawn off and the filtrate is drawn off through the quiescent portion of the bed at the top.

28 Claims, 10 Drawing Figures

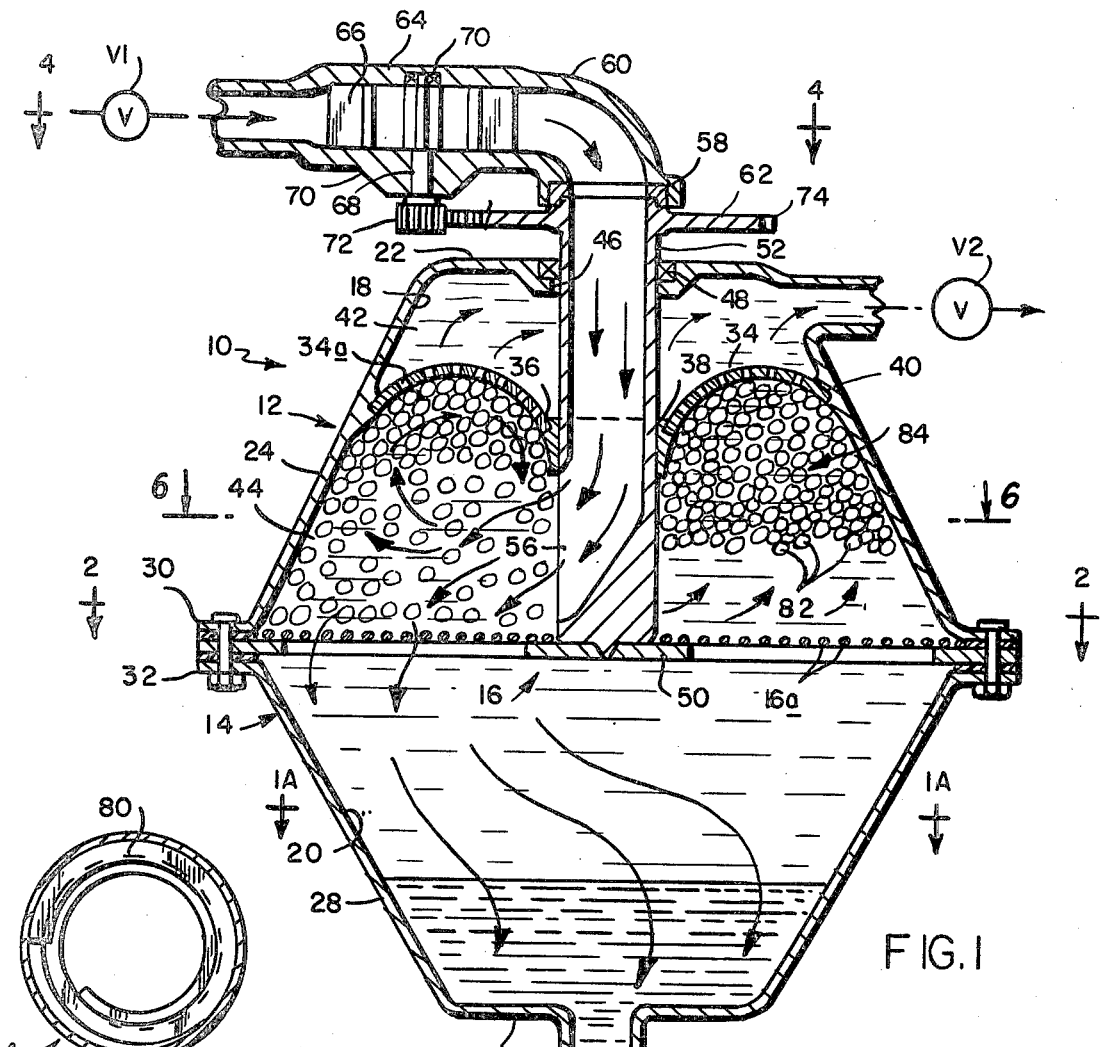
FIG.1
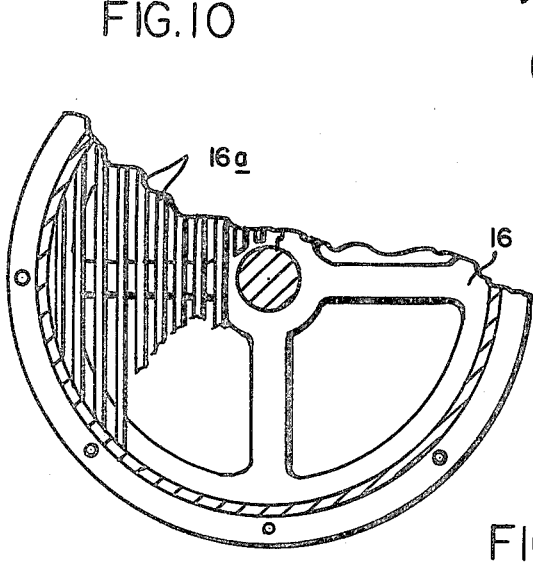
FIG.10
FIG.2
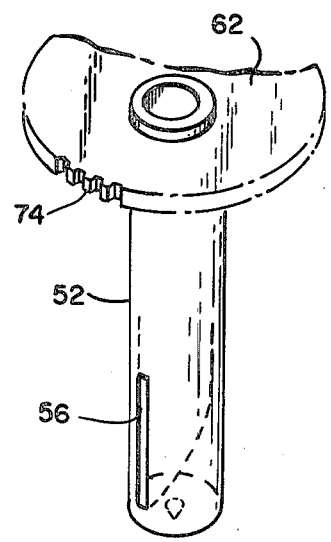
FIG.3

FILTER MODULE

BACKGROUND OF INVENTION

In pending application Ser. No. 308,586, filed Oct. 5, 1981, there is disclosed and described a filter system wherein the fluid to be filtered is delivered into a receptacle containing a bed of discrete, loosely-associated bodies at a pressure to cause weltering of the bodies within the receptacle, with the result that the solid matter in the fluid is separated from the fluid and settles to the bottom. The separation is brought about by deposit of the solids on the surface of the discrete bodies while quiescent and the rubbing of the deposited solids from the bodies while the latter are in motion, that is, weltering, the weltering being caused by the delivery of the fluid at a substantial pressure into the bed of discrete bodies. The system as disclosed is successful when employed for intermittent filtering operations, for example, filtering the flushing from toilets as contrasted to continuous filtering of, for example, industrial waste because of the fact that during the intervals between flushing operations, the discrete bodies in their quiescent state merge to form an effective screen which intercepts and collects the solids and, during flushing, the weltering produced by the pressure of the fluid entering the bed causes rubbing of the deposited solids from the surfaces and opening up the spaces between the discrete bodies so that the solids, when detached, settle.

The system therein shown is not satisfactory for continuous filtering since continuous flow into the bed will keep the bed for the most part in a continuous state of weltering. Very little of the bed is sufficiently quiescent to act as a filter because of the continuous entrance of fluid. It is the purpose of this invention to provide a filter system embodying the principle of alternately weltering a body of discrete buoyant particles and bringing it to a state of rest to provide an effective filter for filtering solids from industrial fluids where such filtering is expected to be on a continuous basis.

SUMMARY OF THE INVENTION

As herein illustrated, the filter module comprises means definiing a closed chamber, means defining a reticulated partition positioned in the chamber intermediate the top and bottom such that there is a space above the partition and a space below the partition, and partition containing a center opening, a rotor supported in the chamber at the center of the partition within the center opening, said rotor extending into the space below the partition and defining a passage terminating at one end in an opening which is in communication with the space below the partition, means for delivering fluid to the other end of the passage for entry by way of the passage into the space below the partition, a plurality of discrete bodies contained within the chamber below the partition, means for rotating the rotor to deliver fluid into the bodies at successive points around the axis of rotation and means for drawing off fluid from the space above the partition and discharging it. There is a second reticulated partition below the first partition which defines in conjunction with the first partition a filter chamber for containing the discrete bodies. The first partition contains circular openings too small to permitt passage of bodies and the second partition contains radially-positioned elongate slots too small to permit passage of the bodies. The means for delivering fluid to the passage in the rotor is comprised of a conductor entering the top of the module into the space above the first parition, rotatedly received by the rotor and in communication with the passage in the rotor. The opening at the terminal end of the passage in the rotor enters the space below the partition, is located at a level such as to introduce fluid into the midst of the bodies, substantially midway between top and bottom and, desirably, is vertically elongate. The means for rotating the rotor may comprise an impeller rotated by the fluid entering the module or by a motor.

In the preferred form, the module comprises symmetrically-positioned frustoconical chambers, the upper one of which provides for filtering and discharge of the filtered fluid and the lower one of which provides for discharging solids. Desirably, the reticulated partition is toroidal in configuration having an upwardly convex/concave surface in the form of an upwardly concave/convex wall. There is a discharge opening at the bottom of the module and the rotor may be provided with a worm rotatable thereby, positioned in the discharge opening to effect discharge of solids deposited at the bottom of the module. A helical rib or baffle may be positioned on the wall of the discharge chamber having as its axis the center of rotation of the rotor and, additionally, baffles may be provided in the discharge chamber. As recited above, in its preferred form the module is comprised of two frustoconical receptacles closed at their smaller ends and open at their larger ends and joined with their larger ends juxtaposed; however, it is within the scope of the invention to use any suitable configuration for the module as, for example, a cylindrical module.

While the aid of the aforesaid module, the method comprises delivering fluids to be filtered into a bed of discrete, buoyant bodies constrained at the top and the outer side, but unconstrained at the bottom at a pressure such as to cause weltering within a relatively restricted zone, moving the point of delivery of the fluid into the bed progressively about the geometric center of the bed to introduce the fluid to successive segmental portions of the bed about the center to cause successive portions of the bed about the center to welter which, in turn, causes rubbing and separation of the bodies so hat solids clinging to the bodies are rubbed off and permitted to gravitate through the separated bodies at the bottom side of the bed while maintaining the remainder of the bed substantially quiescent and drawing off the filtrate from the top side of the bed through the non-weltering, densely-packed portion thereof. In further accordance with the method, the fluid is injected at a pressure and in a radial direction with respect to the center of rotation of the bed in a downward and outward direction to cause a clockwise movement of the bodies in vertical planes in the region of weltering.

The invention will now be described in greater detail with reference to the accompanying drawings, wherein:

FIG. 1 is a vertical section taken transversely of the preferred form of the invention as illustrated and described herein;

FIG. 2 is a fragmentary horizontal section taken on the line 2—2 of FIG. 1;

FIG. 3 is a fragmentary perspective of the rotor removed from the module;

Figure 4:
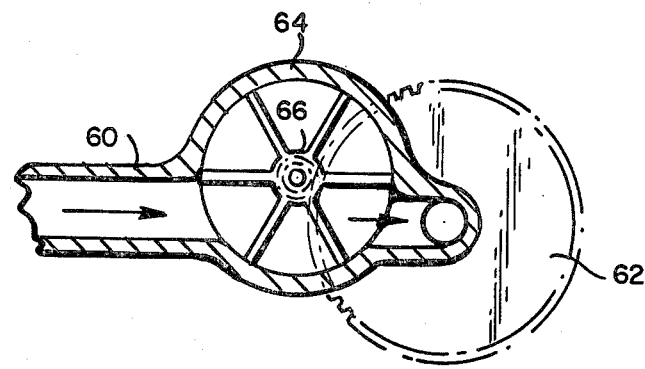
FIG. 4 is a horizontal section taken on the line 4—4 of FIG. 1 showing a gear drive.
Figure 5:
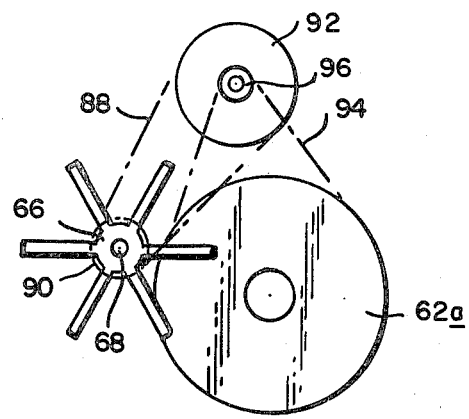
Figure 9:
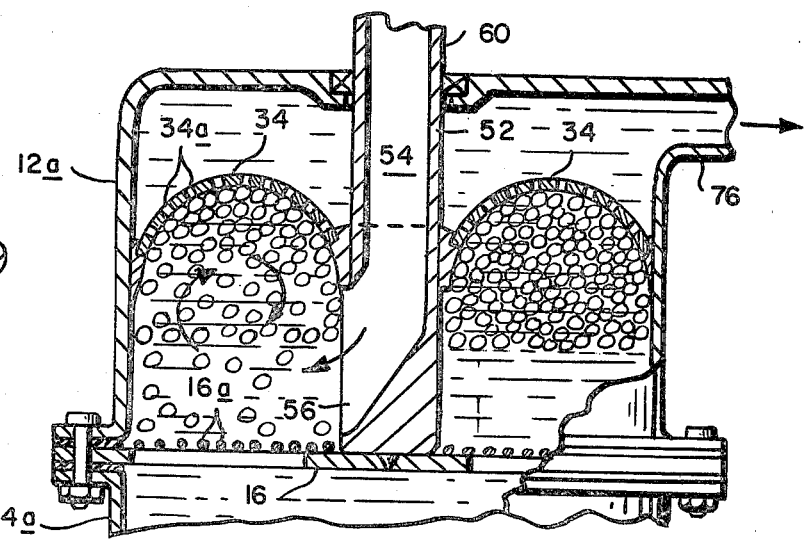
Figure 7:
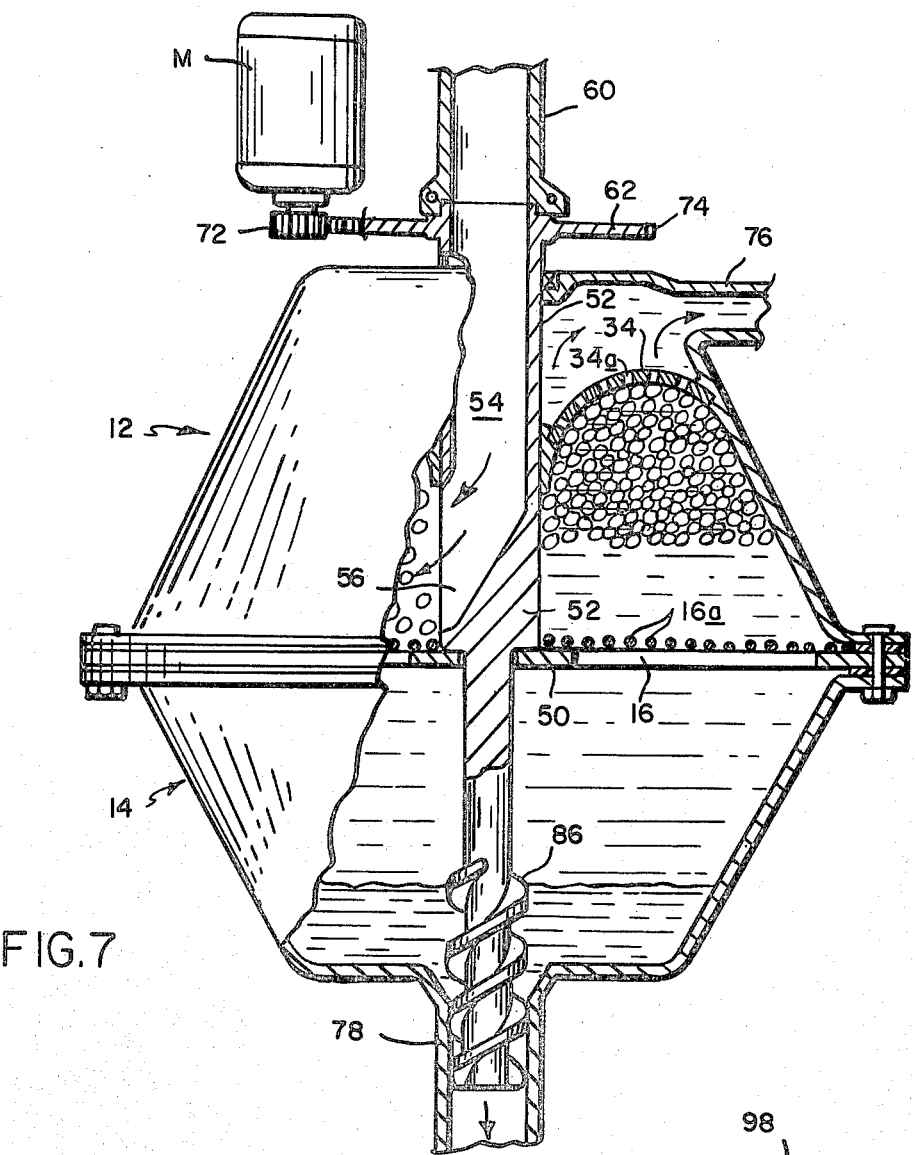
Figure 6:
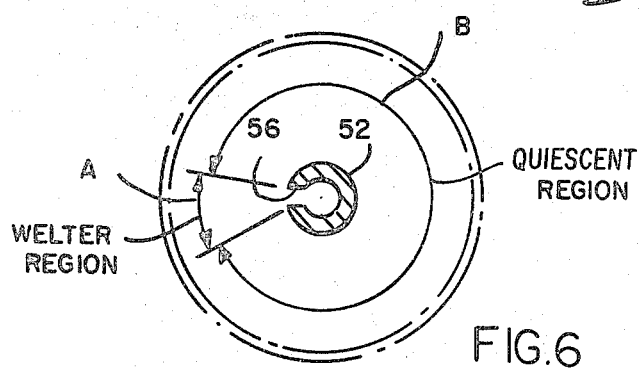
Figure 8:
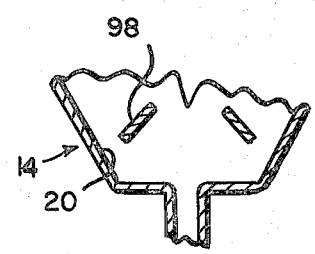

FIG. 5 diagrammatically shows a belt drive in place of the gear drive of FIG. 4;

FIG. 6 is a section taken on the line 6—6 of FIG. 1 diagrammatically illustrating the zones of weltering and quiescence;

FIG. 7 is an elevation partly in section of an alternate form of the invention showing a motor drive in place of the impeller and a screw discharge;

FIG. 8 is an elevation partly in section of the lower part of the module showing an optional provision of baffles;

FIG. 9 is a vertical section taken transversely of an alternative form of the module wherein the module is of cylindrical configuration rather than frustoconical configuration; and FIG. 10 is a section transversely of the lower chamber provided with a spiral baffle.

Referring to the drawings, FIG. 1, the module 10 comprises upper and lower frustoconical parts 12 and 14 secured base-to-base with a reticulated partition 16 therebetween which divides the interior of the module into an upper chamber 18 and a lower chamber 20. The upper chamber 18 thus has a flat horizontal top wall 22 and a downwardly-diverging side wall 24. The lower chamber 20 has a flat horizontal bottom wall 26 and an upwardly-diverging side wall 28. Flanges 30 and 32 at the base of the respective parts 12 and 14 provide for securing the parts to each other with the partition 16 sandwiched therebetween. Between the top wall 22 and the partition 16, there is fixed to the side wall 24 an annular partition 34 containing a center opening 36 within which there is fixed a bearing sleeve 38. The outer edge 40 of the partition is secured to the side wall 24. The partition 34 is concavo/convex in vertical section positioned with the convex side facing upwardly and the concave side facing downwardly and, as thus positioned, divides the upper chamber 18 into a space 42 above the partition which constitutes a discharge chamber and a space 44 below the partition which constitutes a filter chamber. At the top of the module, there is a center opening 46 and bearing ring 48. At the center of the partition 16, there is a bearing plate 50. The center opening 46 and bearing 48 and the bearing plate 50 are in vertical alignment with the center of the bearing sleeve 38 and a rotor 52 is rotatably mounted within the upper chamber with its lower end supported by the bearing plate 50 and with its intermediate and upper end portions rotatably supported, respectively, by the bearing sleeve 38 and the bearing ring 48. The rotor 52 defines an axial passage 54 open at the upper end externally of the module. At the lower end, there is a vertically elongate slot 56 constituting a nozzle-like orifice which provides entrance into the filter chamber 44 between the partitions 16 and 34. The upper end of the rotor 52 externally of the module is rotatably coupled by means of a bearing ring 58 to a conductor 60 so that the rotor can turn freely relative to the conductor 60 while maintaining a fluid-tight joint between it and the conductor. There is also at the upper end of the rotor externally of the module a drive disk 62. The conductor 60 has interposed therein an impeller chamber 64 within which there is mounted an impeller 66 fixed to a shaft 68 suitably journaled in bearings 70 in the top and bottom walls of the impeller chamber. The impeller shaft 68 extends through the bottom wall and has fixed to it a pinion 72 which meshes with teeth 74 peripherally of the drive disk 62. In the form of the invention shown in FIG. 1, the impeller 66 is rotated by delivery of fluid through the conductor 60 and, by such rotation, effects rotation of the rotor 52.

In lieu of the toothed drive disk 62, a pulley 62a can be used as shown in FIG. 5 wherein a belt 88 is entrained at one end about a pulley 90 fixed to the shaft 68 and at its other end about a pulley 92 and a belt 94 entrained at one end about a pulley 96 and at its other end about the pulley 62a. Rotation of the rotor 52 presents the orifice 56 to successive portions of the filter chamber 44 about the axis of rotation of the rotor. A valve V1 in the conductor 60 upstream of the impeller provides for controlling the flow of fluid into the module.

At the top of the module, above the partition 34, there is a filtrate discharge pipe 76 which can be in the side wall 24 or in the top wall 22. A valve V2 provides for controlling the outflow through the pipe 76.

The lower chamber 20, as previously stated, constitutes a solids discharge chamber and, for this purpose, is provided in its bottom 26 with a solids discharge pipe 78 containing a valve V3 for controlling the discharge of solids. In order to promote descent of the solids to the bottom, a helical rib or fin 80, FIG. 10, is attached to the wall 28, the axis of which coincides with the axis of rotation of the rotor and with the center of discharge pipe 78. Additionally, but not necessarily, baffle plates 98, FIG. 8, may be provided within the chamber to counteract eddies which might tend to stir up the solids, that is, order to maintain quiescence at the bottom.

The filter chamber 44 is partially filled with a quantity of discrete, buoyant bodies 82 which, when suspended in flotation within the filter chamber, form about the rotor 52 an annular bed 84 which, because of the buoyancy of the bodies 82, is supported against the partition 34 at the top and confined at its sides by the side wall 24 in the form of a tightly-paced filter medium. The bed fills the filter chamber approximately ½ to ⅔ of its volume. The slot 56 constitutes a discharge nozzle which projects the fluid at a pressure to cause weltering and is so located that it projects the fluid into the chamber radially with respect to the axis of rotation and downwardly and outwardly so as to disperse the bodies at the center lower side of the bed and cause them to move toward the outer side of the filter chamber which, in turn, causes the bodies at the top center to move downwardly into the path of the fluid entering the chamber which, in turn, are dispersed downwardly and outwardly, thus setting up a continuous clockwise flow in vertical planes about the center in the region of weltering.

In operation, the fluid to be filtered is delivered into the conductor 60 upstream of the impeller and after passing through the impeller chamber is delivered by way of the passage 54 into the filter chamber 44 between the partitions 16 and 34. The rotation of the impeller caused by flow of fluid through the impeller chamber rotates the rotor 52 so as to constantly present the discharge slot 56 to different portions of the bed around the axis of rotation. The discharge slot 56 delivers the fluid downwardly and outwardly as shown by the arrows, causing weltering of the bodies at the center lower side of the bed, the effect of which is to cause any solids deposited on the surfaces of the bodies to be rubbed off and to gravitate downwardly through the dispersed bodies. As related above, the downward and outward movement of the bodies confined at the top and outer side causes the bodies to travel in a generally clockwise direction in vertical planes after dispersion at the bottom side of the bed upwardly along the outer side of the chamber and to the top to take the place of bodies at the top which are displaced downwardly and outwardly at the center by the entering fluid. The effect is to disperse the bodies at the bottom to allow the solids to gravitate to the bottom and to densely pack the bodies at the top to provide a dense filter medium at the top. The filtrate is drawn off through the densely-packed bodies at the top constrained by the partition 34 into the discharge chamber 42 and from thence through the pipe 76. The conical slope of the wall 24 and the concavo/convex configuration of the partition 34 contribute to the circulation of the bodies as described as the rotor rotates. it is to be observed that the weltering and dispersion take place only within the immediate region of the bed within which the slot is located at any given time and that the remainder of the bed is substantially quiescent as depicted in FIG. 6 wherein the arrow A represents the region of weltering and dispersion and the arrow B represents the region of quiescence. Desirably, the weltering is restricted to an angle of approximately 20° with reference to the axis of rotation of the rotor, the remaining 80% remaining quiescent. However, it is within the scope of the invention to increase or decrease the region of weltering and the region of quiescence in accordance with the fluid being filtered depending upon the fluidity of the fluid being filtered. In the zone of weltering while the bodies in the upper part of the bed are moving in a generally clockwise direction, they are, nevertheless, because of their buoyancy, packaged tightly against the top and, hence, in spite of their movement, present a dense filter medium through which the filtrate is drawn. The arrangement described provides for continuously renewing the performance of the bed for filtering without requiring counterflow which is common to most filtering equipment. Desirably, the fluid is delivered to the module at 5 to 10 pounds per square inch and the rotor is rotated ¼ to 1½ turns per minute. It is to be observed, however, that the pressure and turns per minute will vary with the fluidity to give optimum results.

During operation, the solids which gravitate to the bottom are guided downwardly and toward the discharge pipe at the center of the bottom both by the converging slope of the side wall 28 and by the helical rib 80. As previously pointed out, baffles 98 may be employed to counteract any tendency for eddies developed by the entrance of the fluid into the filter chamber to be transmitted downwardly into the discharge chamber to thus stir up the solids.

As previously related, there are valves V1, V2 and V3 for controlling the entrance of fluid, discharge of fluid and discharge of solids. These valves can be used to control the proportion of solids removed at any given time.

The partition 34 has circular holes 34a too small to permit the passage of the discrete bodies while the partition 16 is in the form of a grid comprised of spaced, parallel rods 16a of circular cross section, the spaces between which are too small to permit the passage of the discrete bodies, but large enough to permit the solids scrubbed from the discrete bodies to fall through into the chamber 20. The circular cross section of the rods is designed to provide for optimum flow of the solids through the grid without hangup.

If desired, a motor M may be substituted for the impeller as shown in FIG. 7 and when a motor is used in place of the rotor, the impeller chamber and impeller are omitted and the pinion 72 is fixed directly to the motor shaft.

It is also within the scope of the invention, as shown in FIG. 7, to provide an auger-like screw 86 as a prolongation of the lower end of the rotor 52 and axially therewith, a portion of which extends into the discharge pipe 78 to enable forcibly discharging solids deposited at the bottom of the module.

The upper and lower parts 12 and 14 of the module in both FIGS. 1 and 7 are shown to be frustoconical; however, it is within the scope of the invention to substitute for the frustoconical upper and lower parts 12 and 14 parts 12a, 14a, FIG. 9, of cylindrical configuration.

A single filter module is shown herein. However, it is within the scope of the invention to place a series of 2, 3 or more of these filter modules in succession. It has been found that with a single module, approximately 89% of the solids can be removed and with the aid of additional modules, up to approximately 96% to 98% of the solids can be removed.

The discrete bodies used are such as described in pending application Ser. No. 308,586, filed Oct. 5, 1981, incorporated by reference herein and comprise non-absorptive, insoluble, non-corrosive and infrangible materials, for example, plastics selected from any such plastic materials as polyethylene, polypropylene, polybutane and glass reinforced polypropylene. The size and composition of the discrete bodies will depend upon the fluid being filtered.

It should be understood that the present disclosure is for the purpose of illustration only and includes all modifications or improvements which fall within the scope of the appended claims.

What is claimed is:

1. A filter module comprising means defining a closed chamber, means defining a reticulated partition positioned in the chamber intermediate the top and bottom such that there is a space above the partition and a space below the partition, said partition containing a center opening, a rotor supported in the chamer at the center of the partition within the center opening, said rotor extending into the space below the partition and defining a passage terminating at one end in an opening which is in communication with the space below the partition, means for delivering fluid to the other end of the passage for entry by way of the passage into the space below the partition, a plurality of discrete bodies contained within the space below the partition, means for rotating said rotor to effect delivery of the fluid through said opening in communication with the space below the partition into the bodies at successive portions around the center of rotation, a second reticulated partition below the first reticulated partition defining openings too small to permit the passage of the discrete bodies, said second reticulated partition defining in conjunction with the first reticulated partition a filter chamber for containing the discrete bodies, means for collecting solids at the bottom of the module and means for drawing off the filtrate from the space above the partition.

2. A filter module according to claim 1 wherein the reticulated partition is annular in horizontal section and upwardly concavo/convex in vertical section.

3. Apparatus according to claim 1 wherein the reticulated partition is toroidal and of vertical concavo/convex configuration positioned such that its concave side faces upwardly and its concave side faces downwardly.

4. Apparatus according to claim 1 wherein the closed chamber below the reticulated partition has a diverging side wall.

5. Apparatus according to claim 1 wherein the portion of the chamber within which is positioned the reticulated partition is frustoconical.

6. A filter module according to claim 1 wherein the second reticulated partition is comprised of spaced, parallel rods, the spaces between which define slots too small to permit passage of the discrete bodies.

7. A filter module according to claim 6 wherein the opening entering the space below the first reticulated partition is located at a level substantially midway between the first and second reticulated partitions.

8. A filter module according to claim 6 wherein the lower part of the module below the second reticulated partition is downwardly frustoconical.

9. A filter module according to claim 8 wherein there is a helical, inwardly-projecting flange on tthe wall of the module below the second partition.

10. A filter module according to claim 6 wherein the wall of the module below the second partition is downwardly frustoconical and there is a helical rib projecting inwardly from said wall.

11. A filter module according to claim 6 wherein there are bearings at the center of the partitions supporting the rotor for rotation about its vertical axis.

12. A filter module according to claim 1 wherein the first reticulated partition contains circular openings too small to permit passage of the discrete bodies.

13. A filter module according to claim 1 wherein the means for delivering fluid to the passage in the rotor comprises a conductor entering the top of the module into the space above the first reticulated partition rotatably coupled to the rotor.

14. A filter module according to claim 13 wherein the means for rotating the rotor is an impeller rotatable by the flow of fluid through the conductor.

15. A filter module according to claim 13 wherein there is an impeller chamber interposed in the conductor and an impeller positioned in the impeller chamber operable by rotation to effect rotation of the rotor.

16. A filter module according to claim 15 wherein there is a valve positioned in the conductor upstream of the impeller chamber.

17. A filter module according to claim 1 wherein the opening entering the space below the partition is located at such a level as to introduce the fluid into the midst of the bodies substantially midway between the top and bottom limits of the discrete bodies.

18. A filter module according to claim 1 wherein the opening entering the space below the first partition is vertically elongated.

19. A filter module according to claim 1 wherein the opening entering the space below the first reticulated partition is positioned radially with respect to the axis of rotation of the rotor.

20. A filter module according to claim 1 wherein the opening entering the space below the first reticulated partition is of relatively narrow rectangular configuration such that weltering takes place in a relatively small segmental portion of the bed.

21. A filter module according to claim 20 wherein the transverse width of the opening is such as to cause weltering in a region of approximately 20°.

22. A filter module according to claim 1 wherein the means for rotating the rotor is a motor.

23. A filter module according to claim 1 wherein there is a discharge opening at the bottom of the module and a worm at the lower end of the rotor extending through said discharge opening.

24. Apparatus according to claim 1 wherein there is a conductor connected to the passage in the rotor for delivering fluid to the passage in the rotor.

25. A filter module comprising means defining a chamber having facing upper and lower frustoconical portions defining upper and lower chambers, a reticulated partition positioned diametrically of the chamber at the junction of the upper and lower chambers dividing the module symmetrically, a rotor, a bearing at the top of the module and a bearing at the center of the reticulated partition rotatably supporting the rotor, an annular reticulated partition positioned about the rotor between the top of the upper chamber and the bottom thereof, the partition dividing the upper chamber into a discharge chamber at the top and a filter chamber therebelow, a plurality of discrete bodies within said filter chamber, said partitions containing a plurality of circular holes and a plurality of elongate slots too small to prevent passage of the discrete bodies but large enough to permit filtrate to pass through and said rotor defining an axial passage, one end of which is positioned at the top of the module externally thereof and the other end of which enters the chamber between the partitions, means at the top of the module for drawing off filtrate, means at the bottom of the module for drawing off solids, a drive member fixed to the rotor and means mounted to the module for drivably driving the drive member and, hence, effecting rotation of the rotor.

26. A method of separating solids from fluids within which they are suspended comprising projecting the fluid into a bed of buoyant discrete bodies at the center thereof and to successive portions thereof about said center in a direction downwardly and outwardly such as to cause clockwise rotation of the bodies in the bed in vertical planes about the center with weltering and dispersion of the bodies as they move from the region at the top of the bed into the region at the bottom so as to rub off solids and allow them to gravitate downwardly and restoration of the scrubbed bodies to the upper region in densely-packed relation such as to continuously present a clean filter medium at the top and drawing off the filtrate through the densely-packed filter medium at the top.

27. A method of separating solids from fluids within which they are suspended comprising projecting the fluid to be filtered into a floating bed of discrete bodies constrained at the top side and at the outer side but unconstrained at the bottom side, at the center thereof and to successive portions thereof about said center in a direction downwardly and outwardly such as to cause clockwise rotation of the bodies in the bed in vertical planes about the center with weltering and dispersion of the bodies as they move from the region at the top side of the bed into the region at the bottom side so as to rub off solids and allow them to gravitate downwardly and restoration of the scrubbed bodies to the upper region in densely-packed relations such as to continuously present a clean filter medium at the top side and drawing off the filtrate through the densely-packed filter medium at the top.

28. A method according to claim 27 comprising providing a relatively quiescent region below the bed of discrete bodies for receiving the solids removed from the discrete bodies.

* * * * *